(12) United States Patent
Maile

(10) Patent No.: US 8,282,449 B2
(45) Date of Patent: Oct. 9, 2012

(54) CUTTING VALVE AND METHOD FOR MAKING PORTIONS

(75) Inventor: Bernd Maile, Oggelshausen (DE)

(73) Assignee: Albert Handtmann Maschinenf Abrik GmbH & Co. KG, Biberach (DE)

( * ) Notice: Subject to any disclaimer, the term of this patent is extended or adjusted under 35 U.S.C. 154(b) by 282 days.

(21) Appl. No.: 12/648,388

(22) Filed: Dec. 29, 2009

(65) Prior Publication Data

US 2010/0203816 A1 Aug. 12, 2010

(30) Foreign Application Priority Data

Feb. 10, 2009 (EP) .................................... 09001826

(51) Int. Cl.
A22C 11/04 (2006.01)
(52) U.S. Cl. ............................................ 452/30; 452/32
(58) Field of Classification Search .............. 452/30–31, 452/35–36, 38–39
See application file for complete search history.

(56) References Cited

U.S. PATENT DOCUMENTS

| | | | |
|---|---|---|---|
| 2,004,618 A | 6/1935 | Schmidt | |
| 3,786,703 A * | 1/1974 | Piel | ................................. 83/882 |
| 4,565,054 A | 1/1986 | Piereder | |
| 4,748,866 A * | 6/1988 | Weyer | ......................... 74/424.92 |
| 4,901,806 A * | 2/1990 | Forrest | ............................ 175/321 |
| 5,035,671 A | 7/1991 | Anderson et al. | |
| 5,041,055 A * | 8/1991 | Roth | ............................. 452/140 |
| 5,580,305 A * | 12/1996 | McFarland | ..................... 452/138 |
| 5,746,106 A * | 5/1998 | Hodges | ........................... 83/884 |
| 6,231,911 B1 * | 5/2001 | Steinback et al. | ............. 426/518 |
| 6,248,013 B1 * | 6/2001 | Thomas et al. | ............... 452/149 |
| 7,052,387 B2 * | 5/2006 | Ilch et al. | ....................... 452/155 |
| 7,481,701 B2 * | 1/2009 | Cusick et al. | .................. 452/177 |

FOREIGN PATENT DOCUMENTS

| | | |
|---|---|---|
| DE | 604511 C | 10/1934 |
| DE | 622880 C | 12/1935 |
| DE | 703938 C | 3/1941 |
| DE | 1180151 B | 10/1964 |
| DE | 1432504 A1 | 3/1969 |

* cited by examiner

*Primary Examiner* — David Parsley

(74) *Attorney, Agent, or Firm* — Marshall, Gerstein & Borun LLP

(57) ABSTRACT

A cutting valve for portioning a paste-like mass, having a partitioning piston which is drivable in a portioning chamber with an inlet relative to the inlet and which comprises a cutting edge which during partitioning is movable to sweep over the inlet, the partitioning piston is drivable in the partitioning process to perform a helical movement with simultaneous translatory and rotatory movement components, so that the cutting edge carries out a draw cut in the mass strand.

14 Claims, 2 Drawing Sheets

CUTTING VALVE AND METHOD FOR MAKING PORTIONS

CROSS-REFERENCE TO RELATED APPLICATION

The present application claims the benefit of priority of European Patent Application No. 09001826.8, filed Feb. 10, 2009. The entire text of the priority application is incorporated herein by reference in its entirety.

FIELD OF THE DISCLOSURE

The present disclosure relates to a cutting valve and to a method therefor.

BACKGROUND

In practice, cutting valves and portioning units, respectively, are known in the form of a cylinder with an axially movable piston. The mass strand is e.g. introduced via a lateral inlet into the cylinder before the partitioning piston partitions a portion by performing an axial movement and axially discharges the portion.

As a rule, either volumetric portioning units or continuously intermittently working portioning units without any volumetric portioning operation are here concerned. In the volumetric portioning process the mass is filled under a specific pressure into the defined portioning chamber, the portion is partitioned and subsequently pushed out. The size of the portioning chamber to be filled must here be matched with the size of the portion. Moreover, the maximum portion size is here limited by the maximum overall size of the portioning chamber. Furthermore, two separately controlled drives are normally needed because the partitioning or cutting function and the discharging function are performed separately. Often, only one single drive is used in the continuously intermittent portioning process. The axial drive movement of the piston with its cutting edge results in a cutting function that is not optimum because a squeezing cut with an exclusively axial pressing movement of the cutting edge of the piston is carried out in the mass strand. The product in the mass strand is squeezed more or less strongly, which leads to varying portion weights and a diffuse cutting profile in the mass strand. This is particularly disadvantageous in the case of lumpy or fibrous products of the food industry, such as sausage or ham masses, because product parts may get damaged. Large ham pieces are even drawn or squeezed into the portion. These drawbacks may even be increased by the fact that the piston bottom, which is actually used for discharging the partitioned portion, enters into the mass strand concurrently with the cutting edge, so that the pressure in the cutting area increases locally strongly and contributes to a further damaging of product constituents. The cutting edge on the rim of the piston bottom is possibly prevented from performing a clean cutting movement on the counter edge of the inlet.

It is known from DE 1 432 504 A that a stuffing piston is arranged in reciprocating fashion for portioning sausage meat in the portioning chamber, the piston first receding under the pressure of the mass filled into the portioning chamber and being then shifted by a linear drive for discharging purposes. The stuffing piston in its piston skirt has a generally U-shaped cutout with two circumferentially spaced-apart, approximately axially extending edges and serves per se only as a rotary slide and portion restrictor that in a rotary position connects the inlet to the portioning chamber and simultaneously separates the portioning chamber from the outlet, and in another rotary position shuts off the inlet and connects the portioning chamber to the outlet. There are two separate drives for linearly shifting the stuffing piston for discharging purposes and for rotating the same back and forth for switching purposes. The portioning process is a volumetric one, wherein a pressing piston is respectively adjusted in a filling cylinder connected to the inlet at a specific pressure and through a predetermined stroke. A complicated sequence control is provided for the drives. The edges of the stuffing piston perform squeezing cuts in the mass strand because the stuffing piston is only rotated for switching.

In a device known from DE 1 180 151 A, the portioning chamber contains a rotary slide which can only be rotated back and forth, and a piston which can only be reciprocated linearly, with two drives being needed for said members. The rotary slide performs a squeezing cut in the mass strand.

SUMMARY OF THE DISCLOSURE

It is the object of the present disclosure to provide a cutting valve of the above-mentioned type, as well as a portioning method, with which the product to be portioned is treated in an optimal gentle way, and which combines the advantages of two separate drives for the partitioning and ejecting operations with the advantages of only one single drive.

Since the partitioning piston is drivable during partitioning to carry out a helical movement with simultaneous translatory and rotatory movement components, a draw cut is carried out by the cutting edge in the mass strand, the draw cut treating fibrous or lumpy product constituents in an optimal gentle way and neatly cutting off the same. The helical movement can advantageously be performed with a single drive e.g. for the partitioning piston, resulting in a simple and compact structure of the cutting valve. Furthermore, the clean cutting conditions and the gentle treatment of the mass yield portion weights that are exactly observed.

In a particularly expedient embodiment, optionally of independent disclosed importance, the piston bottom yields to the spring force in an axially movable way, while the portion is partitioned by the partitioning piston from the mass strand. This minimizes a squeezing action of the piston bottom on the mass strand, and fibrous or lumpy product constituents are treated even more gently, whereby during partitioning, and depending on the cutting pressure, additional room is provided for the product to be portioned, which contributes inter alia to a further optimized cut. Although the helical movement of the cutting edge and the axial resilience of the piston bottom contribute each as such to an optimized cut, the combination of the two measures in one cutting valve constitutes an optimal solution for the stated object.

In an expedient embodiment the partitioning piston is a hollow piston or piston tube having at least one open end, and the cutting edge is arranged at the open end of the partitioning piston. The cutting edge may here be provided on a ring insert arranged at the open end, preferably exchangeably. It is thereby possible to make e.g. the cutting edge from a material of higher quality than that of the partitioning piston, which is made from a material that is e.g. selected for achieving optimized sliding characteristics.

In an expedient embodiment the partitioning piston is connected to a linear drive that is first generating translatory movement components. To accomplish a helical movement of the cutting edge, a gearing is arranged between the partitioning piston and the linear drive or the portioning chamber for deriving the rotatory movement component from the translatory movement component and for transmitting said component to the piston at the same time. Hence, only one single drive is needed. This, however, should not rule out the option of using a different drive which replaces the gearing, for the rotatory movement components.

In a constructionally simple manner the gearing is composed of at least one engagement element provided laterally with respect to the piston axis, and of a thread-like guide path for the engagement element. Either the engagement element or the guide path is connected to the piston. The guide path or the engagement element, respectively, is then arranged on the other component.

In a preferred embodiment, the guide path is arranged on the inside in the portioning chamber configured as a cylinder with the laterally positioned inlet for the mass strand. Preferably, the guide path is directly provided in an inner wall of the cylinder or, even better, in a guide sleeve arranged in the cylinder for guiding the partitioning cylinder. The use of the guide sleeve offers the advantage to accomplish both good friction and good guidance between the partitioning piston and the guide sleeve independently of the material of the cylinder.

In the case of the guide sleeve the inlet in the cylinder is extended by means of a lateral opening in the guide sleeve. Expediently, an interior opening edge in the guide sleeve forms a counter cutting edge cooperating with the cutting edge of the partitioning piston while a portion is partitioned, so that the draw cut is gently carried out for the product between two relatively sharp cutting edges.

In an expedient embodiment, the inlet is circular or oval and slit-shaped, respectively, the axis of the oval or slit being inclined in the discharge direction of the partitioning piston opposite to the rotational direction of the cutting edge. As a result, a draw cut already arises from the translatory movement component, which cut could even be intensified by the rotatory movement component. The cutting edge may here he positioned in a radial plane of the partitioning piston or may at least be inclined in a partial section relative to the piston axis to intensify the effect of the draw cut in the mass strand by using the rotatory movement component.

Expediently, the guide path extends in circumferential direction over a dimension corresponding at least to the width of the inlet as viewed in circumferential direction so that a draw cut is carried out in a continuous manner while the inlet is swept over. Moreover, the helical movement has also an advantageous effect on the service life of the cutting edge because the cutting work can be distributed over a greater length of the cutting edge than would be the width of the inlet as viewed in circumferential direction.

To prevent a driving of the cutting edge with the helical movement when the cutting edge has not yet penetrated or no longer penetrates the mass strand, the guide path comprises approximately axial end sections expediently following a central section extending with a pitch. When the engagement element is moving in the axial sections, rotatory movement components that cannot be used for the cut are not generated.

Expediently, the thread pitch of the guide path is steeper than a self-locking pitch, so that only minor efforts are required for driving the partitioning piston. The thread pitch may here be uniform or variable at least over part of the translatory movement component. With a uniform thread pitch a uniform draw cut is also carried out. With a variable pitch a temporarily stronger or weaker rotatory movement component can be generated for example when the cutting edge enters into the mass strand and/or shortly before the cutting edge exits out of the mass strand or deliberately in the middle of the mass strand so as to achieve a locally adapted draw cut.

In an advantageous embodiment, the piston bottom is displaceably guided in the interior of the piston or at least a spring is arranged between the piston bottom and a spring abutment in the partitioning piston. For instance a stop provided in the partitioning piston can define an end position for the piston bottom in discharge direction. This permits e.g. the use of a biased spring to adjust the pressure response characteristics of the piston bottom in the case of a volumetric portioning process, if necessary. The spring force or spring rate of the spring can be chosen in response to the pressure actuation surface of the piston bottom to be smaller than the force resulting at least during the partitioning of the portion from the mass strand from the supply pressure of the mass on the pressure actuation surface of the piston bottom. The spring force can even be chosen to be dependent on the cutting pressure. The piston bottom is yielding in a reliable manner to provide additional room and the cutting edge permits a free draw cut.

In a constructionally simple embodiment the partitioning piston is a piston tube which is non-rotatably seated on a plunger, the engagement element is a transverse pin in the guide sleeve, the transverse pin engaging with at least one end into a guide path in the guide sleeve, and the linear drive of the partitioning piston is a compressed-air or hydraulic cylinder which is arranged at the end of the portioning chamber and comprises a piston rod coupled with the plunger. The plunger may here be rotatably connected to the piston rod or to the piston of the linear drive, so that the rotational resistance of the piston of the linear drive does not inhibit the rotatory movement components of the cutting edge. By contrast, in the case of a rigid connection, which is also possible between the piston rod and the plunger, the piston of the linear drive is co-rotating upon rotation of the cutting edge.

In the draw cut made in the mass strand according to the method, mass components are treated very gently, and portion sizes and portion weights, respectively, which are to be observed in an exact way, are obtained because a squeezing of the mass constituents during the partitioning operation is largely avoided. The helical movement can be generated either by driving the partitioning piston or the cylinder forming the portioning chamber, or by simultaneously driving the portioning chamber and the partitioning piston.

Furthermore, according to the method the cutting conditions can be optimized in the case of the draw cut when the piston bottom of the partitioning piston provided for discharging the portion is displaced in spring-loaded fashion through the mass in a direction opposite to the discharge direction relative to the partitioning piston. Additional room is thereby provided for the operation of the cutting edge. The piston bottom can already be displaced in advance of the draw cut and/or during the draw cut against the elastic force.

BRIEF DESCRIPTION OF THE DRAWINGS

Embodiments of the subject matter of the disclosure are explained with reference to the drawings, in which.

DETAILED DESCRIPTION OF THE PREFERRED EMBODIMENT

Figure 1:
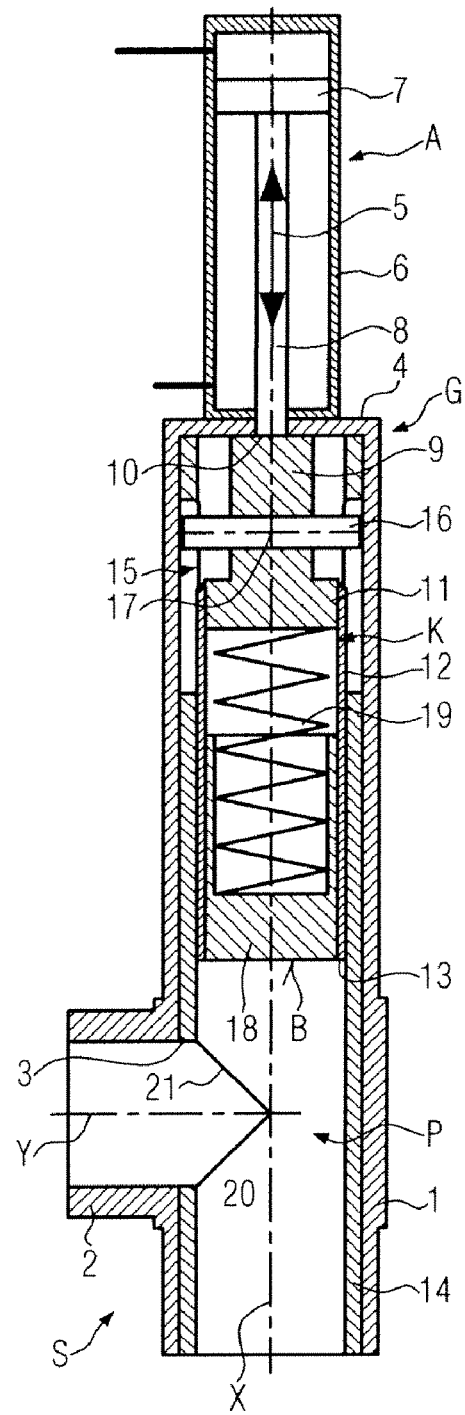
FIG. 1 shows an axial section of a cutting valve, in a preparatory phase of a portioning operation.

As shown in FIG. 1, in a cutting valve S for portioning a paste-like mass a portioning chamber P is contained in a cylinder 1 which is open at one end and comprises at least one lateral connecting pipe 2 which is connected to a storing and/or conveying unit (not shown) for the paste-like mass, e.g. a product of the food industry, e.g. sausage meat or ham or ham mass of lumpy or fibrous consistency. The connecting pipe 2 defines an inlet 3, here a lateral one, in the portioning chamber P. A mass strand from which the cutting valve S intermittently partitions portions and discharges the same, for instance by pushing them out, is supplied through the inlet 3.

The cylinder 1 has a bottom 4 with a passage opening for a piston rod 8 of a linear drive A, the housing 6 thereof being arranged on the bottom 4 or next thereto and containing a piston 7. The linear drive A is e.g. a compressed-air or hydraulic cylinder. As an alternative, an electromechanical spindle drive, or the like, would also be possible as a linear drive A.

The piston rod 8 is connected to a plunger 9 of e.g. mushroom-shaped cross section in the portioning chamber P, either rigidly or rotatably via a rotary connection 10 between the piston rod 8 and the plunger 9 or the piston 7. The plunger 9 has a collar 11 on which a partitioning piston K is fixed. In the illustrated embodiment the partitioning piston K is a piston tube 12 with a cutting edge 13 at the open end. In an alternative embodiment (not shown) the cutting edge 13 could be provided on a ring insert exchangeably arranged on the open end of the piston tube 12 and made of the same material as or also of a material differing from the material of the piston tube 12.

In the cylinder 1, a guide sleeve 14 in which the partitioning piston K is guided is fixed on the inside. In addition to its guiding function, the guide sleeve 14 contributes to a gearing G with which, apart from translatory (axial movement) components T (FIG. 2), rotatory movement components R are simultaneously generated for the cutting edge 13 and the partitioning piston K, respectively, from the reciprocating movements (double-headed arrow 5) of the linear drive A.

Figure 2:
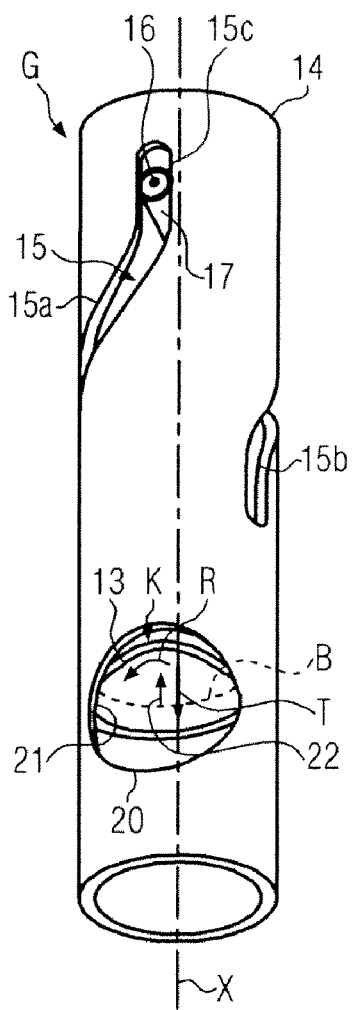
FIG. 2 is a perspective view of a detail of FIG. 1.

In the embodiments shown in FIGS. 1 and 2, the gearing G comprises at least one guide path 15 for an engagement element 16, the respective engagement element 16 being an end of a transverse pin 17 in the plunger 9. In the guide sleeve 14 two diametrically opposite guide paths 15 are formed, either as continuous slits or as grooves of thread-like extension. According to FIG. 2 axial guide path sections 15*a*, 15*b* follow the thread-like extension of the guide path 15 at both ends. The upper axial extension in FIG. 2 could extend up to the open end of the guide sleeve 14 (for simplified mounting of the plunger 9 and the partitioning piston K).

In the illustrated embodiment the partitioning piston K comprises an axially movably guided piston bottom B, which is e.g. a cup-shaped piston 18 in the interior of the piston tube 12, and is supported by a spring 19 in an axially resilient way. The spring 19, in turn, is supported on the plunger 9 acting as a spring abutment. A stop (not shown) may be provided between the piston bottom B and the partitioning piston K to define the extension movement of the piston bottom B in discharge direction (in FIG. 1 downwards). The spring 19 could then be used in a biased state.

The inlet 3 of the cylinder 1 is extended by an inlet 20 in the guide sleeve 14; the inlet 20 can here foi in a sharp cutting edge 21 in cooperation with the cutting edge 13 on the inner wall.

FIG. 2 shows in the inlet 20 how, when a portion is partitioned from the mass strand, the cutting edge 13 of the partitioning piston sweeps over the counter cutting edge 21 in discharge direction with a translatory movement component T, while simultaneously generating a rotatory movement component R (a helical movement), so that a draw cut is executed between the cutting edge 13 and the counter cutting edge 21 in the mass strand. During cutting the piston bottom B can recede in response to the cutting pressure in the direction of an arrow 22 against the force of spring 19, thereby minimizing its squeezing action in the mass strand and providing additional room for the portion. On account of the receding movement of the piston bottom B, the cutting edge 13 can be optimally used.

The guide path 15 is shown in FIG. 2 with a uniform pitch 15*c*, so that a continuous rotatory movement component R within which the cutting edge 13 sweeps over the inlet 20 is generated over the axial range of the translatory movement component T. As an alternative, the pitch could be variable so as to generate a temporarily more progressive or degressive rotatory movement component R, for instance at the beginning and/or towards the end of the partitioning process, or also in the middle of the mass strand, i.e., for locally intensifying or reducing the draw cut.

In an alternative (no) shown), the gearing G could also be provided directly between the cylinder 1 and the plunger 9 (or the partitioning piston K) (without the guide sleeve 14). Furthermore, it would be possible to accommodate the gearing G in the linear drive A.

Figure 3:
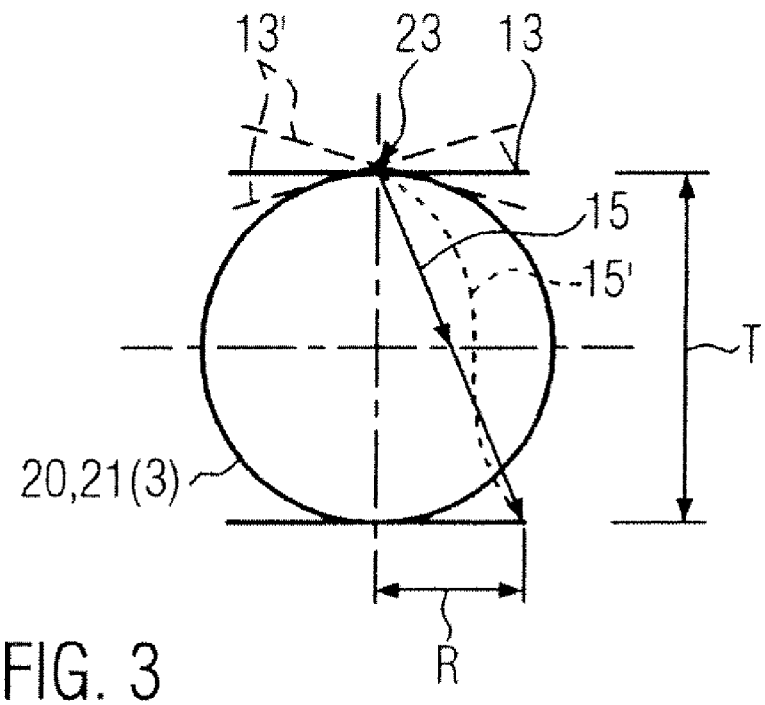
FIG. 3 is a schematic view for explaining the function of the cutting valve of FIGS. 1 and 2.

FIG. 3 schematically illustrates the sequence while a portion is partitioned from a mass strand. The cutting edge 21 of the inlet 20 is circular while the cutting edge 13 in a radial plane of the partitioning piston K extends in a straight line. 23 illustrates the first point of contact of the cutting edge 13 with the inlet 20. While the cutting edge 13 sweeps over the inlet 20, it simultaneously generates the translatory movement component T and the superimposing rotatory movement component R, so that the point of contact 23 is gradually displaced more and more to the right side and a draw cut is carried out in the mass strand entering in situ.

In a developed view of the guide sleeve 14 of FIG. 2, the guide path 15 can approximately follow a straight line, so that the rotatory movement component R is generated in a uniform manner and directly in proportion to the translatory movement component T.

By contrast, if the pitch e.g. of the guide path 15' is variable, the rotatory movement component R is progressively increasing and then decreasing again e.g. at the beginning and towards the end of the partitioning process or also in the middle of the mass strand.

Figure 4:
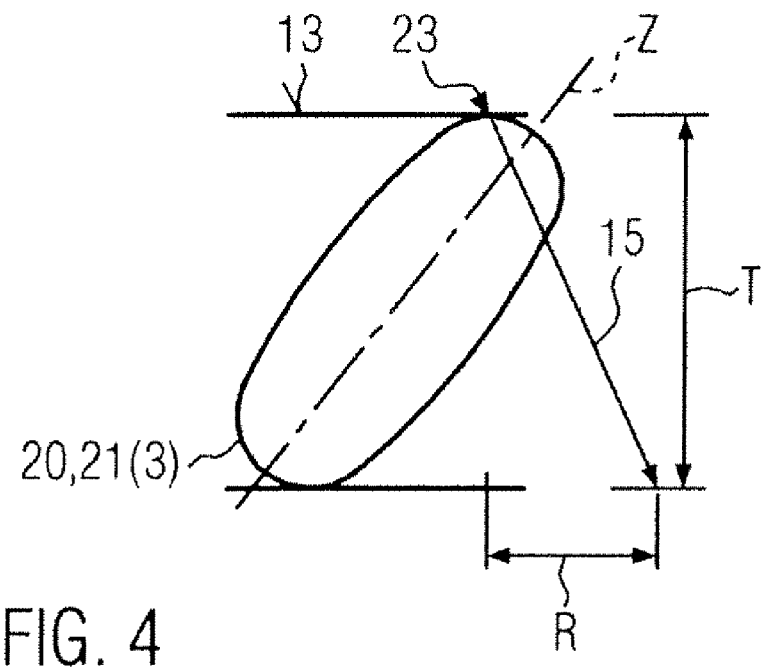
FIG. 4 is a schematic view of a detail variant.

A slit-shaped or oval inlet 20, 21, and 3, respectively, is illustrated in FIG. 4 as an alternative to a cutting valve S, the oval or slit axis Z thereof extending in oppositely oblique orientation relative to the pitch of the guide path 15. The draw cut is thereby additionally intensified. The mass strand is so to speak displaced during the cutting movement of the cutting edge 13 in a direction opposite to the rotatory movement component R.

In the embodiments of FIGS. 1 to 4, the partitioning piston K is driven relative to the inlet 3 to perform the helical movement. As an alternative, the cylinder 1 could also be driven relative to the partitioning piston K, or both the partitioning piston K and the cylinder 1 could be driven to produce, on the whole, the draw cut in the mass strand.

With the cutting valve S a portioning method is carried out wherein for partitioning the portion in the mass strand a draw cut is performed in the mass strand that is very gentle with mass components, resulting in exactly observed sizes and weights, respectively, of the portions. To carry out the draw cut, either the partitioning piston K or the cylinder 1 is driven, or these two components of the cutting valve S are driven accordingly. Concurrently, either in advance of or during the draw cut, the mass can displace the relatively movable piston bottom (B), which is per se provided for discharging the portion, in a resilient manner in a direction opposite to the discharge direction in the partitioning piston K so as to achieve predominantly optimum cutting conditions.

The invention claimed is:

1. A cutting valve for partitioning a portion from a mass strand of a paste-like sausage or ham mass, the cutting valve comprising a partitioning piston which is drivable in a portioning chamber at least in a longitudinal direction of the portioning chamber, the portioning chamber having at least one inlet located laterally with respect to the partitioning piston in the portioning chamber for introducing the mass strand into the portioning chamber to carry out a portioning movement relative to the inlet, the partitioning piston comprising a cutting edge which is movable to sweep over the inlet and crosswise through the mass strand extending through the inlet into the portioning chamber while a portion is being partitioned, wherein the partitioning piston while partitioning the portion is drivable to perform a helical movement with simultaneous translatory and rotatory movement components and to carry out a draw cut at the location of the inlet with the cutting edge through the mass strand;

wherein the partitioning piston is connected to a linear drive generating the translatory movement components, and a gearing is arranged between the partitioning piston and one of the linear drive or the portioning chamber, with which gearing the rotatory movement components are derivable from the translatory movement components and transmittable to the partitioning piston at the same time; and wherein the gearing comprises at least one engagement element, which is provided at the side relative to the piston axis, and at least one thread-like guide path for the engagement element, and that either one of the engagement element or the guide path is connected to the partitioning piston, or the guide path or the engagement element, respectively, is arranged in a stationary manner.

2. The cutting valve according to claim 1, wherein the partitioning piston is one of a hollow piston or piston tube with at least one open end, and the cutting edge is provided on a ring insert arranged on the open end.

3. The cutting valve according to claim 1, wherein the guide path is provided in the interior in the portioning chamber formed as a cylinder with the laterally positioned inlet.

4. The cutting valve according to claim 1, wherein the inlet is either one of circular, oval or slit-shaped, respectively, the oval or slit axis in the discharge direction of the portion being inclined in a direction opposite to the direction of the rotatory movement component of the partitioning piston during the partitioning operation, and that the cutting edge is positioned either in one of a radial plane of the partitioning piston or extends at least in some areas obliquely relative to the piston axis.

5. The cutting valve according to claim 1, wherein the guide path extends in circumferential direction over a dimension corresponding at least to the width of the inlet, viewed in circumferential direction.

6. The cutting valve according to claim 1, wherein the guide path comprises an approximately axial section on at least one end of a thread-like center section.

7. The cutting valve according to claim 1, wherein the thread pitch of the guide path is steeper than a self-locking pitch.

8. The cutting valve according to claim 2, wherein the ring insert arranged exchangeably, on the open end.

9. The cutting valve according to claim 3, wherein the guide path is provided either one of directly in an inner wall of the cylinder or in a guide sleeve arranged in the cylinder for the partitioning piston.

10. The cutting valve according to claim 9, wherein the inlet is extended into the cylinder through a lateral opening in the guide sleeve, and that an opening edge located on the inside forms a counter cutting edge of the guide sleeve cooperating with the cutting edge of the partitioning piston while a portion is partitioned.

11. The cutting valve according to claim 9, wherein the partitioning piston comprises a piston tube non-rotatably seated on a plunger, that the engagement element is provided on a transverse pin in the plunger, that both ends of the transverse pin engage into a respective one of two guide paths in the guide sleeve, and that the linear drive is one of a compressed-air or hydraulic cylinder with a piston rod coupled with the plunger, and that a rotary connection is provided between the piston rod and one of the plunger or a piston of the cylinder.

12. The cutting valve according to claim 7, wherein the thread pitch is one of 45° or more and is uniform.

13. The cutting valve according to claim 7, wherein the thread pitch of the guide path varies with the extension of the guide path.

14. A cutting valve for partitioning a portion from a mass strand of a paste-like sausage or ham mass, the cutting valve comprising a partitioning piston which is drivable in a portioning chamber at least in a longitudinal direction of the portioning chamber, the portioning chamber having at least one inlet located laterally with respect to the partitioning piston in the portioning chamber for introducing the mass strand into the portioning chamber to carry out a portioning movement relative to the inlet, the partitioning piston comprising a cutting edge which is movable to sweep over the inlet and crosswise through the mass strand extending through the inlet into the portioning chamber while a portion is being partitioned, wherein the partitioning piston while partitioning the portion is drivable to perform a helical movement with simultaneous translatory and rotatory movement components and to carry out a draw cut at the location of the inlet with the cutting edge through the mass strand, wherein the partitioning piston includes a piston bottom for discharging the portion partitioned off from the mass strand out of the portioning chamber, the piston bottom being spring-loaded in the discharge direction of the portion and being axially movable relative to the partitioning piston while the partitioning piston partitions the portion off from the mass strand; and wherein the piston bottom is displaceably guided in the partitioning piston, and that at least one spring is arranged between the piston bottom and a spring abutment of the partitioning piston.

* * * * *

UNITED STATES PATENT AND TRADEMARK OFFICE
CERTIFICATE OF CORRECTION

PATENT NO. : 8,282,449 B2
APPLICATION NO. : 12/648388
DATED : October 9, 2012
INVENTOR(S) : Maile Page 1 of 1

It is certified that error appears in the above-identified patent and that said Letters Patent is hereby corrected as shown below:

On the Title Page, Item (73), "Assignee", in Column 1, Line 1, delete "Maschinenf Abrik" and insert -- Maschinenfabrik --.

Signed and Sealed this
Twenty-first Day of October, 2014

Michelle K. Lee
*Deputy Director of the United States Patent and Trademark Office*